United States Patent
Panteli et al.

(10) Patent No.: US 12,487,152 B2
(45) Date of Patent: Dec. 2, 2025

(54) SCALABLE METHOD FOR PRODUCING TRANSFECTION REAGENTS

(71) Applicant: Ultragenyx Pharmaceutical Inc., Novato, CA (US)

(72) Inventors: Jan Panteli, Cambridge, MA (US); Ying Jing, Reinach (CH)

(73) Assignee: Ultragenyx Pharmaceutical Inc., Novato, CA (US)

( * ) Notice: Subject to any disclaimer, the term of this patent is extended or adjusted under 35 U.S.C. 154(b) by 1497 days.

(21) Appl. No.: 16/612,002

(22) PCT Filed: May 9, 2018

(86) PCT No.: PCT/US2018/031865
§ 371 (c)(1),
(2) Date: Nov. 8, 2019

(87) PCT Pub. No.: WO2018/208960
PCT Pub. Date: Nov. 15, 2018

(65) Prior Publication Data
US 2020/0124505 A1     Apr. 23, 2020

Related U.S. Application Data

(60) Provisional application No. 62/503,660, filed on May 9, 2017.

(51) Int. Cl.
*G01N 1/28*     (2006.01)
*C12M 1/00*     (2006.01)
(Continued)

(52) U.S. Cl.
CPC ............... *G01N 1/28* (2013.01); *C12M 23/14* (2013.01); *C12M 23/26* (2013.01); *C12M 23/28* (2013.01);
(Continued)

(58) Field of Classification Search
CPC ...... C12M 23/26; C12M 27/16; C12M 27/02; C12M 23/14; C12M 23/28; B01L 3/505;
(Continued)

(56) References Cited

U.S. PATENT DOCUMENTS 5,387,484 A    2/1995  Doany et al.
5,658,785 A    8/1997  Johnson
(Continued)

FOREIGN PATENT DOCUMENTS

ES    2266197 T3    3/2007
ES    2358315 T3    5/2011
(Continued)

OTHER PUBLICATIONS

Qiagen "Effectene Transfection Reagent Handbook" May 2002 (Year: 2002).*

(Continued)

*Primary Examiner* — Tracy Vivlemore
*Assistant Examiner* — Lauren K Van Buren
(74) *Attorney, Agent, or Firm* — Antheros Legal Advisors LLP

(57) ABSTRACT

The invention provides easy-to-scale methods of creating DNA/transfection reagent master mixes for transfecting cells in culture.

13 Claims, 12 Drawing Sheets

(51) Int. Cl.
*C12M 3/06* (2006.01)
*C12N 7/00* (2006.01)
*C12N 15/85* (2006.01)

(52) U.S. Cl.
CPC .............. *C12M 27/16* (2013.01); *C12N 7/00* (2013.01); *C12N 15/85* (2013.01); *C12N 2750/14111* (2013.01)

(58) Field of Classification Search
CPC ..... B01L 2300/0867; B01L 2400/0487; G01N 1/28; C12N 7/00; C12N 15/85; C12N 2750/14111; C12N 2750/14151
See application file for complete search history.

(56) References Cited

U.S. PATENT DOCUMENTS

| | | | |
|---|---|---|---|
| 5,688,676 | A | 11/1997 | Zhou et al. |
| 5,691,176 | A | 11/1997 | Lebkowski et al. |
| 5,741,683 | A | 4/1998 | Zhou et al. |
| 5,872,005 | A | 2/1999 | Wang et al. |
| 6,004,797 | A | 12/1999 | Colosi |
| 6,127,175 | A | 10/2000 | Vigne et al. |
| 6,156,303 | A | 12/2000 | Russell et al. |
| 6,489,162 | B1 | 12/2002 | Shenk et al. |
| 6,566,118 | B1 | 5/2003 | Atkinson et al. |
| 6,723,551 | B2 | 4/2004 | Kotin et al. |
| 6,753,419 | B1 | 6/2004 | Toniatti et al. |
| 6,846,665 | B1 | 1/2005 | Horer et al. |
| 6,943,019 | B2 | 9/2005 | Wilson et al. |
| 7,271,002 | B2 | 9/2007 | Kotin et al. |
| 7,510,872 | B2 | 3/2009 | Clark et al. |
| 8,076,139 | B1 * | 12/2011 | Hamm .................. C12N 15/85 435/325 |
| 8,163,543 | B2 | 4/2012 | Urabe et al. |
| 8,409,842 | B2 | 4/2013 | Clark et al. |
| 8,512,981 | B2 | 8/2013 | Hermens et al. |
| 8,980,247 | B2 | 3/2015 | Meyers et al. |
| 2002/0081721 | A1 | 6/2002 | Allen et al. |
| 2002/0115189 | A1 | 8/2002 | Natsoulis et al. |
| 2002/0127582 | A1 | 9/2002 | Atkinson et al. |
| 2004/0053410 | A1 | 3/2004 | Horer et al. |
| 2004/0235173 | A1 | 11/2004 | Bleck et al. |
| 2005/0112765 | A1 | 5/2005 | Li et al. |
| 2005/0148076 | A1 | 7/2005 | Allen |
| 2006/0013063 | A1 | 1/2006 | Singh |
| 2010/0248355 | A1 | 9/2010 | Atkinson et al. |
| 2011/0251547 | A1 | 10/2011 | Xing et al. |
| 2012/0058917 | A1 | 3/2012 | Gaken et al. |
| 2013/0035371 | A1 | 2/2013 | Fitzgerald et al. |
| 2014/0056919 | A1 | 2/2014 | Xing et al. |
| 2014/0359799 | A1 | 12/2014 | Wang et al. |
| 2015/0024467 | A1 | 1/2015 | Sheldon et al. |
| 2015/0353899 | A1 | 12/2015 | Pechan et al. |
| 2016/0257972 | A1 | 9/2016 | van der Loo et al. |

FOREIGN PATENT DOCUMENTS

| | | |
|---|---|---|
| WO | WO-1999/063064 A1 | 12/1999 |
| WO | WO-2013063379 A1 | 5/2013 |
| WO | WO-2014018423 A2 | 1/2014 |

OTHER PUBLICATIONS

Raymond et al. A simplified poyethylenimine-mediated transfection process for large-scale and high-throughput applications (Year: 2011).*

Extended European Search Report for corresponding European Application No. 18798067.7 dated Nov. 30, 2020.

O'Hagan et al., "Microparticle-based technologies for vaccines", Methods. vol. 40, No. 1 (2006), pp. 10-19.

Grieger et al., "Production of recombinant adeno-associated virus vectors using suspension HEK293 cells and continuous harvest of vector from the culture media for GMP FIX and FLT1 clinical vector", American Society of Gene & Cell Therapy. vol. 24, (2016), pp. 287-297.

International Search Report and Written Opinion for corresponding International Application No. PCT/US2018/031865 dated Jul. 20, 2018.

Qiagen, "Effectene transfection reagent handbook", (2002), pp. 1-28.

Raymond et al., "A simplified polyethylenimine-mediated transfection process for large-scale and high-throughput applications", Methods. (2011), pp. 1-8.

* cited by examiner

FIG. 4A (Contd.)
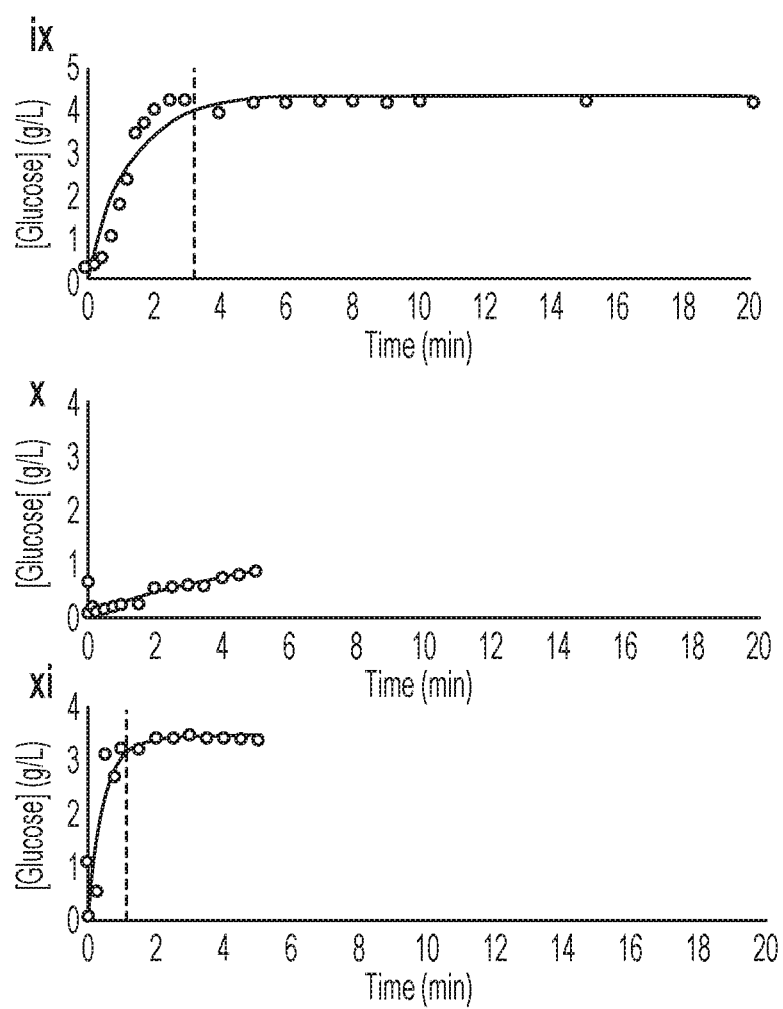

SCALABLE METHOD FOR PRODUCING TRANSFECTION REAGENTS

CROSS-REFERENCE TO RELATED APPLICATIONS

This application is a U.S. national stage application, filed under 35 U.S.C. § 371, of International Application No. PCT/US2018/031865 filed on May 9, 2018, which claims the benefit of and priority to U.S. Provisional Patent Application No. 62/503,660, filed on May 9, 2017, the entire contents of each of which are hereby incorporated by reference in their entireties for all purposes.

FIELD OF THE INVENTION

The invention relates generally to methods for producing transfection reagents.

BACKGROUND

Transient transfection is the temporary introduction of nucleic acid molecules into a eukaryotic cell. As the name implies, the effect of transient transfection lasts only as long as the nucleic acid is present, undegraded, within the cell. Transient gene expression through transient transfection enables a wide variety of applications, including gene silencing, protein production, virus production, and others.

Transient transfection is fast and relatively inexpensive, as compared to stable cell line generation, making it an attractive alternative for the provision of materials for toxicological studies, preclinical trials, and early clinical trials, where the quantity of material required is relatively small One area where the use of transient transfection methods has potential is in the production of recombinant adeno-associated viral (rAAV) vectors. Successful preclinical studies have encouraged the use of rAAV vectors for therapeutic gene transfer to patients in the clinical setting. The successful use of rAAV in clinical trials has underscored the need for production and purification systems capable of generating large amounts of highly pure rAAV particles. Transient transfection is an efficient method that can rapidly deliver some or all of the genes necessary for rAAV production to large numbers of cells in culture, thereby avoiding the need to use live helper virus for rAAV production and eliminating the time for development and stability testing required for stable cell line based processes.

Numerous transient transfection methods are known in the art, including liposome-based transfection; chemical-based transfection, for example methods utilizing calcium phosphate, cationic polymers, DEAE-dextran, or activated dendrimers; microinjection; electroporation; magnetic beads; nanoparticles; or cell squeezing. However, while these methods are useful for small-scale transfections, they are impractical for commercial scale production (e.g., 50 L and above) because they either involve reagents that are prohibitively expensive or are impractical to scale (in the case of, e.g., nanoparticles, microinjection, electroporation), or there is a lack of robust methods for practicing the method at scale, and for scaling-up the method once optimized at small-scale, as is the case for many chemical- and liposome-based transfection methods, including calcium phosphate, cationic polymers, DEAE-dextran, and activated dendrimers. In particular, there is a lack of robust methods for creating DNA/transfection reagent master mix at intermediate and large scales. There is therefore a need in the art for a robust, scalable, inexpensive method for transiently transfecting cells in culture.

SUMMARY OF THE INVENTION

The invention is based, in part, upon the discovery of consistently effective methods of preparing a transfection master mix that involve rocking the master-mix using a mechanical rocking device. In one aspect, the invention provides a method for preparing a transfection master mix that includes (1) introducing a DNA solution and a transfection reagent solution into a mixing container to create a transfection master mix; (2) rocking the mixing container with a mechanical rocking device for a period sufficient to reach a steady state concentration of DNA within the transfection master mix; and (3) incubating the transfection master mix for an incubation period, during which the transfection master mix is substantially still. In some embodiments, the incubation period is between 5 to 180 minutes. In some embodiments, the method also includes transfecting cells by contacting the cells with the transfection master mix. In some embodiments, the cells are disposed in a bioreactor, and the method also includes sterilely introducing the master mix into the bioreactor. In some embodiments, the transfection master mix is introduced into the bioreactor by gravity feed (one batch or multiple batches in series or parallel) or pumping. In certain embodiments, the transfection master mix is introduced into the bioreactor by pumping, for example, at a rate of less than or equal to 1 liter per minute, a rate of 1-4 liters per minute, or a rate of greater than or equal to 4 liters per minute.

In one aspect of the invention, the transfection master mix is prepared by combining a DNA solution and a transfection reagent solution in a mixing container. It is contemplated that the DNA solution consists essentially of DNA dissolved in an appropriate solvent. The DNA can be in any form, for example, double stranded DNA, single stranded DNA, or DNA in a vector, for example, a plasmid. In some embodiments, the DNA solution comprises plasmids selected from the group of cis plasmids, trans-rep-cap plasmids, and helper plasmids. In some embodiments, the DNA solution comprises plasmids selected from the group of rAAV cis plasmids, rAAV trans-rep-cap plasmids, and helper plasmids for rAAV production. In some embodiments, the DNA is dissolved in water or cell culture media. It is contemplated that the DNA solution may be sterilized, for example, by filter sterilization. In some embodiments, the DNA solution is sterilized prior to adding the DNA solution to the mixing container. In some embodiments, the DNA solution is introduced into the mixing container sterilely.

It is contemplated that the transfection reagent solution will consist essentially of a transfection reagent dissolved in an appropriate solvent, for example, water or cell culture media. It is contemplated that the transfection reagent may be any chemical transfection reagent that will spontaneously form a complex with DNA in solution. In some embodiments, the transfection reagent is selected from the group consisting of cationic polymers, calcium phosphate, DEAE-dextran, activated dendrimers, and cationic lipids. In certain embodiments, the transfection reagent is a cationic polymer, for example, a polyethylenimine (PEI). PEI may have an average molecular weight of between 1 kDa and 160 kDa, or between 4 kDa and 40 kDa. It is contemplated that the transfection reagent solution may be sterilized, for example, by filter sterilization. In some embodiments, the transfection reagent solution is sterilized prior to adding the transfection reagent solution to the mixing container. In some embodiments, the transfection reagent solution is introduced into the mixing container sterilely.

In one aspect of the invention, the transfection master mix is prepared in a mixing container. It is contemplated that the mixing container may be a single-use disposable container, and/or a pre-sterilized container. It is further contemplated that the mixing container may be a plastic bag, for example, a single-use cell culture bag. In some embodiments, the cell culture bag is inflated, for example, the cell culture bag may be partially inflated, or may be fully inflated so that the exterior of the bag is rigid. It is contemplated that the mixing container will have a volume of at least 1 L, for example, at least 5 L, at least 10 L, at least 20 L, at least 50 L, at least 100 L, at least 200 L, at least 500 L, or at least 1000 L. It is contemplated that the mixing container may be made from any non-toxic material that is able to be sterilized. Exemplary materials include plastics, for example: EVA, PE, LDPE, ULDPE, or PVC.

In one aspect of the invention, the transfection master mix is prepared using a mechanical rocking device. In some embodiments, the mechanical rocking device comprises a rocking platform on which the mixing container is disposed during the rocking step of the instant method. In some embodiments, the mechanical rocking device rocks the mixing container in a single degree of freedom. In some embodiments, the mechanical rocking device rocks the mixing container in a wave motion. In some embodiments, the mechanical rocking device is capable of being set to rock at a predetermined rate. In some embodiments, the mechanical rocking device is capable of being set to rock at a predetermined rocking period. In some embodiments, the mechanical rocking device is capable of being set to rock at a predetermined rocking angle.

In one aspect of the invention, the mixing container is rocked for a period sufficient to reach a steady state concentration of DNA within the transfection master mix. It is contemplated that the rocking is sufficient to induce a wave motion in the transfection master mix. In some embodiments, the rocking is along a single axis (i.e., with a single degree of freedom). It is contemplated that the mixing container is mixed by rocking the mixing container from its starting position (e.g., 0°) through a maximum angle of inclination (e.g., 15°, 20°, or 25°), at which point the motion of the mixing container is reversed and the container is rocked in the reverse direction. This maximum angle of inclination is referred to as the rocking angle. It is contemplated that the rocking angle may be predetermined. In some embodiments, the predetermined rocking angle is in the range of 5° and 20°, for example, in some embodiments, the mixing container is rocked at a predetermined angle of about 15°. In some embodiments, the mixing container is rocked at a predetermined angle of about 12°. In some embodiments, the mixing container is rocked at a predetermined angle of about 7°. It is contemplated that the mixing container is rocked at a predetermined rate. In some embodiments, the predetermined rate is between 1 and 30 rpm, between 5 and 25 rpm, or between 10 and 20 rpm; for example, the predetermined rocking rate may be 10 rpm, 11 rpm, 12 rpm, 13 rpm, 14 rpm, 15 rpm, 16 rpm, 17 rpm, or 18 rpm. It is contemplated that the mixing container is rocked for a period sufficient to reach a steady state concentration of DNA within the transfection master mix. In some embodiments, the rocking period is 10 minutes or less, for example, about 1 minute, about 2 minutes, about 3 minutes, about 4 minutes, about 5 minutes, about 6 minute, about 7 minutes, about 8 minutes, about 9 minutes, or about 10 minutes.

In one aspect of the invention, the master mix is incubated for an incubation period. In some embodiments, the incubation period is between 5 to 180 minutes. In some embodiments, the incubation period is between 10 and 60 minutes, for example, between 10 and 20 minutes, between 20 and 30 minutes, between 20 and 40 minutes, between 20 and 50 minutes, or between 20 and 60 minutes. It is contemplated that in some embodiments, during the incubation period the master mix is kept substantially still. In some embodiments, the master mix is kept in the mixing container on the rocking platform of the mechanical rocking device. In some embodiments, the incubation is performed at room temperature. In some embodiments, the incubation is performed at below room temperature, for example, at 4° C.

It is contemplated that the master mix prepared by the method of the instant invention will have a volume of greater than 1 L. For example, the transfection master mix may have a volume of 4 L or greater, of 12 L or greater, of 15 L or greater, of 25 L or greater, of 50 L or greater, of 100 L or greater, of 200 L or greater, of 500 L or greater, or of 1000 L or greater. In some embodiments, the transfection master mix may have a volume of between 1 L and 200 L, between 5 L and 100 L, or between 15 L and 50 L. For example, the transfection master mix may have a volume of 4 L, 12 L, 15 L, 25 L, 27 L, 29 L, 50 L, 100 L, 150 L, or 200 L.

In some embodiments, a transfection master mix with a volume of 4L is rocked at a predetermined angle of 7°, at a rate of 10 rpm, for a duration of 1 to 2 minutes. In some other embodiments, a transfection master mix with a volume of 12 L is rocked at a predetermined angle of 12°, at a rate of 15 rpm, for a duration of 1 to 2 minutes. In some other embodiments, a transfection master mix with a volume of 15L is rocked at a predetermined angle of 10°-15°, for example, 12°; at a rate of 12-20 rpm, for example, 15 rpm; for a duration of 1 to 4 minutes, for example, about 1 minute, about 2 minutes, about 3 minutes, or about 4 minutes. In some other embodiments, a transfection master mix with a volume of 25 L is rocked at a predetermined angle of 10°-15°, for example, 12°; at a rate of 12-20 rpm, for example, 15 rpm; for a duration of 1 to 4 minutes, for example, about 1 minute, about 2 minutes, about 3 minutes, or about 4 minutes. In some other embodiments, a transfection master mix with a volume of 29 L is rocked at a predetermined angle of 10°-15°, for example, 12°; at a rate of 12-20 rpm, for example, 15 rpm; for a duration of 1 to 4 minutes, for example, about 1 minute, about 2 minutes, about 3 minutes, or about 4 minutes.

Another aspect of the invention involves producing a recombinant adeno-associated virus (rAAV) by transfecting rAAV producer cells with a transfection mix described above.

BRIEF DESCRIPTION OF THE DRAWINGS

FIG. 3A depicts the rAAV titer produced by cells transfected with master mixes prepared at three different concentrations (either 10 µg/ml DNA and 20 µg/ml PEI, 20 µg/ml DNA and 40 µg/ml PEI, or 40 µg/ml DNA and 80 µg/ml PEI) by 10× inversion followed by 20 minutes of incubation at room temperature. FIG. 3B depicts the rAAV titer produced by cells transfected with a master mix (20 µg/ml DNA and 40 µg/ml PEI) prepared by 10× inversion followed by 20 minutes of incubation at room temperature, with mild agitation (100 rpm for 20 minutes) or high agitation (150 rpm for 20 minutes). The result of each condition is the average of two replicates, and each error bar represents a standard deviation. FIG. 3C depicts the rAAV titer produced by cells transfected by a master mix (20 µg/ml DNA and 40 µg/ml PEI) prepared by 10× inversion followed by incubation at room temperature for the indicated period. The result of each condition is the average of two replicates, and each error bar represents a standard deviation.

DETAILED DESCRIPTION

Figure 1:
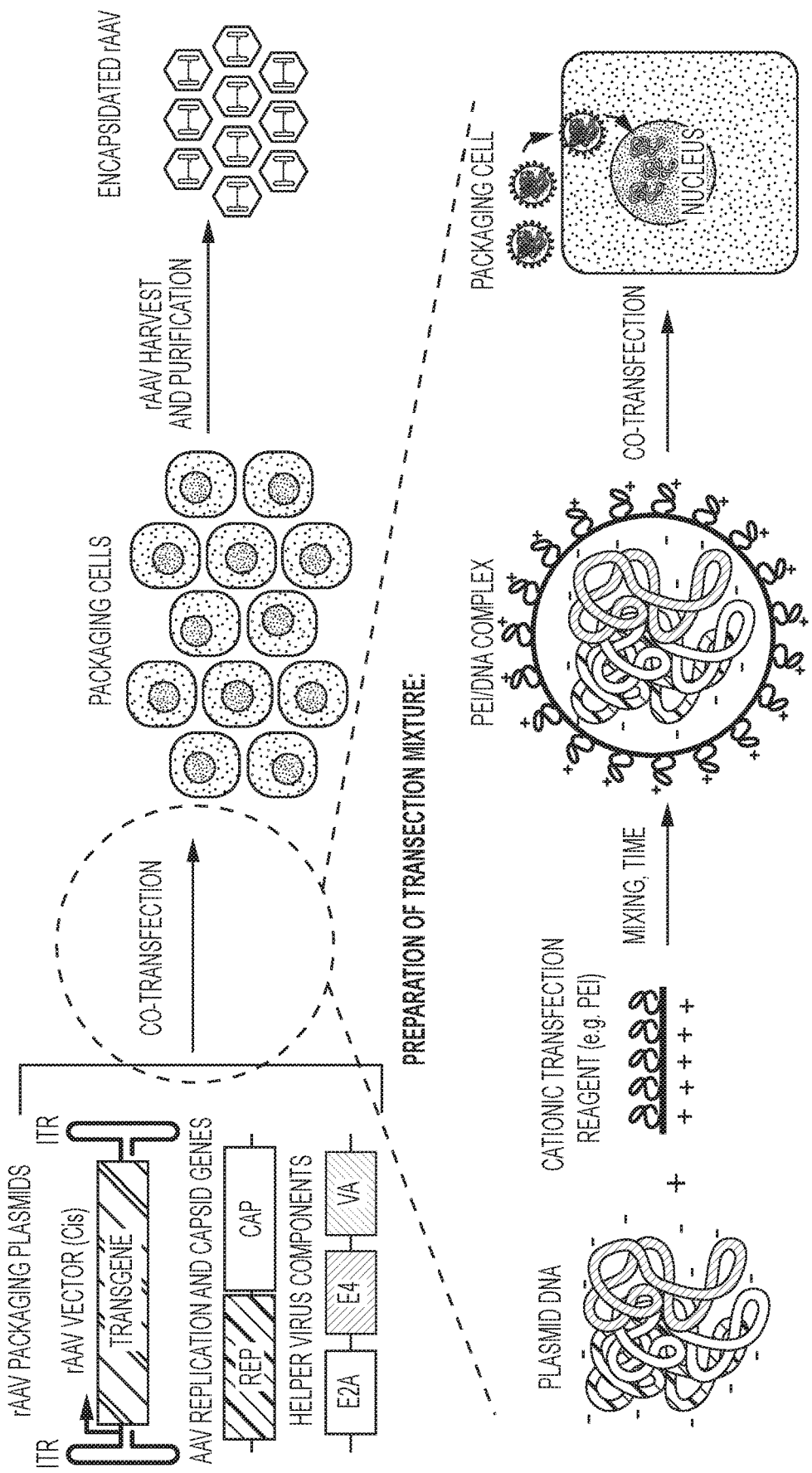
FIG. 1 is a schematic of the helper-free production of rAAV via transient transfection with cationic polymer (e.g., PEI). Helper-free transient transfection for AAV production typically utilizes three separate plasmids that are co-transfected into the packaging cells. These plasmids are the cis-plasmid, containing the inverted terminal repeats ("ITR") sequences flanking the gene of interest (including a promoter and transgene); the trans-rep-cap-plasmid, which contains the AAV replication genes and the genes encoding AAV capsid proteins (VP1, VP2, and VP3); and the helper plasmid, containing the adenovirus or other helper virus genes that facilitate rAAV viral replication. Co-transfection with the three rAAV packaging plasmids typically involves the preparation of a transfection mixture, a mixture of the three plasmids and a transfection reagent, for example, polyethyleneimine (PEI). The mixing of the PEI and the plasmids requires optimization of the mixing method and incubation time to form PEI/DNA complexes that are effective for scale-up of rAAV manufacturing.

Methods for transiently transfecting cells in culture using chemical transfection reagents for example PEI, calcium phosphate, DEAE-dextran, activated dendrimers, and cationic lipids are known in the art. See, e.g. Kingston, R. E., et al., (2003). Calcium phosphate transfection. Current protocols in molecular biology, 9-1 (Calcium phosphate transfection); Ehrhardt, C., et al., Polyethylenimine, a cost-effective transfection reagent. Signal Transduction 6.3 (2006): 179-184 (PEI transfection); Selden, R. F. 2001. Transfection Using DEAE-Dextran. Current Protocols in Immunology. 3: VI:10.14: 10.14.1-10.14.6. (DEAE-Dextran transfection); Dean, D. A., and Gasiorowski J. Z. "Dendrimer-mediated transfection." Cold Spring Harbor Protocols 2011.3 (2011): prot5584. (Dendrimer transfection). Prior art methods generally comprise the step of combining a solution containing the chemical transfection reagent with a solution containing the DNA to be transfected to form a master mix, followed by a mixing step. Mixing is often accomplished by rotary shaking, or by repeated inversion of the container containing the master mix, or by other manual mixing techniques. Prior art methods are generally unsuitable for large-scale transient transfection where master mix volumes of many liters are required. The instant invention provides a robust method for producing master mix at large volumes using inexpensive equipment.

A. Transfection Reagents

It is contemplated that the method of the instant invention may be used to prepare a transfection master mix using any chemical or liposomal transfection reagent that functions by forming a complex with DNA in solution, and where the formation of the DNA/transfection reagent complex is facilitated by gentle mixing. It is further contemplated that this method of instant invention can be incorporated into any transfection method that comprise the following general steps: (1) Preparation of separate DNA and transfection reagent solutions; (2) combination of the DNA solution and transfection reagent solution to allow formation of the DNA/transfection reagent complex (the "master mix"); and (3) contacting cells with the DNA/transfection reagent complex, for example by adding the master mix to the media of cells in culture.

Exemplary transfection reagents that may be used in instant invention include cationic polymers, for example, polyethylenimine (PEI), and DEAE-dextran; calcium phosphate; dendrimers, lipofection reagents, for example, cationic lipids for example Lipofectamine transfection reagents e.g., Lipofectamine® 2000 (Life Technologies), and neutral fusogenic lipids, for example FuGENE® (Promega). Polyethylenimine (PEI) is a cationic polymer of repeating units comprised of an amine group and a two carbon aliphatic $CH_2CH_2$ spacer. PEI a well-known transfection reagent, and, without being bound to a particular theory, is believed to function by forming condensed PEI/DNA particles with a positive charge. These particles bind to anionic cell surface residues and enter the cell via endocytosis. Once inside the cell, PEI's high buffering capacity results in osmotic swelling which causes the endosome to burst, resulting in the release of the PEI/DNA complex into the cytoplasm. Exemplary PEI products include PEIpro® (Polyplus), PEI-Max 4 kDa or 40 kDa (Polysciences).

It is theorized that each of these transfection reagents functions by forming a complex with DNA in solution, and that complex formation is necessary to carry the DNA into the cell. However, following complex formation, transfection reagent/DNA complexes are capable of complex-complex aggregation, and the formation of these aggregates decreases transfection efficiency. The methods of this instant invention are optimized to facilitate complex formation while limiting complex-complex aggregation.

The transfection reagent solution used in the method of the instant invention may be prepared according to standard techniques known in the art. For example, transfection reagents may be dissolved in any appropriate cell culture media, including serum-free cell culture media, or dissolved in any appropriate cell culture buffer for example phosphate buffered saline (PBS), or dissolved in water. Transfection reagent solutions may be at any concentration suitable for preparing a transfection master mix by standard techniques, for example from 10 µg/ml to 400 µg/ml.

B. DNA Solution

It is contemplated that the method of the instant invention may be used to prepare a transfection master mix using DNA from any source suitable for transfecting eukaryotic cells. The DNA can be in any form, for example, double stranded DNA, single stranded DNA, or DNA in a vector, for example a plasmid. The DNA solution may be prepared according to standard techniques known in the art. For example, the DNA may be dissolved in any appropriate cell culture media, including serum-free cell culture media, or may be dissolved in PBS or water. DNA solutions may be at any concentration suitable for preparing a transfection master mix by standard techniques, for example from 10 µg/ml to 200 µg/ml.

C. Mechanical Rocking Device

It is contemplated that the rocking step of the method of the instant invention will be accomplished using a mechanical rocking device to rock the mixing container. It is contemplated that the mechanical rocking device may be any device capable of repeatedly tilting the mixing container along a horizontal axis. In one embodiment, the mechanical rocking device includes a rocking platform, and the mixing container may be disposed atop the rocking platform during the rocking step. It is contemplated that the motion of the mechanical rocking device can be limited to a single degree of freedom, and to a predetermined rocking angle. It is further contemplated that the mechanical rocking device is capable of rocking the mixing container at a predetermined rate. Exemplary mechanical rocking devices include the ReadyToProcess WAVE™ 25 (GE), the WAVE Bioreactor™ system 20/50, 200, and 500/1000 (GE), the CHEMcell® ROCKER BIOREACTOR SYSTEM (ChemGlass), the BIOSTAT® RM 20, RM 50, RM 200, and RM 600 (Sartorius), and the SmartRocker system (Finesse). Each of the aforementioned rocking devices is also capable of inflating the cell culture bag when operated according to the manufacturer's instructions.

D. Mixing Containers

It is contemplated that a method according to the instant invention may be carried out using a variety of containers. In some embodiments of the current invention, the method is carried out using a pre-sterilized container. In this context, pre-sterilized means that the container is sterilized prior to use in the instant method, for example, the container may be sterilized by the manufacturer of the container, for example, by gamma irradiation. In some embodiments of the invention, the mixing container will be disposable or single-use. It is further contemplated that the method of the invention may be carried out using a plastic bag as the mixing container. It is contemplated that the plastic bag will be capable of being sealed so that the transfection master mix does not escape the bag during the rocking step of the method. The method may be carried out using commercially available cell culture bags. Cell culture bags are sterile, single use bags that have been adapted to as bioreactors for the culture of eukaryotic cells. Exemplary cell culture bags for use in the instant invention include CHEMcell® six or eight port cell culture bags (ChemGlass) in 20 L and 50 L bag volumes; BIOSTAT® CultiBags (Sartorius) in 20 L, 50 L, 200 L, and 600 L bag volumes; Cellbag™ Bioreactor Chambers (GE) in 10 L, 20 L, 25 L, 50 L, 500 L, and 1000 L bag volumes; and SmartBags (Finesse) in 10 L, 25 L, and 50 L bag volumes.

E. Methods of Determining Master Mix Quality

Helper virus-free production of rAAV via transient transfection may be used as a proxy for the quality of transfection master mix. FIG. 1 provides graphical depiction of an exemplary rAAV production process. rAAV vectors are produced by co-transfecting packaging cells with three plasmids containing the genes necessary to produce a complete rAAV: the cis plasmid, containing the inverted terminal repeat (ITR) sequences flanking the gene of interest (generally including a promoter and transgene), the trans-rep-cap plasmid, which contains the AAV replication genes and genes encoding the AAV capsid proteins (VP1, VP2, and VP3), and the helper plasmid, containing the adenovirus or other helper virus genes that facilitate rAAV viral replication. Suitable packaging cells include HeLa, HEK293, COS, A549, BHK, or Vero cells. The three plasmids are dissolved in a suitable media to create a DNA solution for use in the method of the instant invention and combined with a transfection reagent solution to create a master mix. The master mix is then mixed and incubated as desired. Following incubation, the master mix is added to packaging cells in culture at, for example, approximately 5%-6.5% vol./vol. (v/v). The transfected packaging cells are then cultured for 3 to 5 days, after which time the rAAV particles are harvested. rAAV particles may be obtained from packaging cells by lysing the cells. Lysis of packaging cells can be accomplished by methods that chemically or enzymatically treat the cells in order to release the viral particles. These methods include the use of nucleases for example benzonase or DNAse, proteases for example trypsin, or detergents or surfactants. Physical disruption, for example homogenization or grinding, or the application of pressure via a microfluidizer pressure cell, or freeze-thaw cycles may also be used. Alternatively, supernatant may be collected from packaging cells without the need for cell lysis.

rAAV titer is used as a measure of the master mix quality. rAAV titer can be quantified using a number of methods, including quantitative polymerase chain reaction (qPCR) (Clark et al., Hum. Gene Ther. 10, 1031-1039 (1999)). DNase-resistant particles (DRP) are quantified by real-time quantitative polymerase chain reaction (qPCR) (DRP-qPCR) in a thermocycler (for example, an iCycler iQ 96-well block format thermocycler (Bio-Rad, Hercules, CA)). In this technique, samples containing rAAV particles are incubated in the presence of DNase I (100 U/ml; Promega, Madison, WI) at 37° C. for 60 minutes, followed by proteinase K (Invitrogen, Carlsbad, CA) digestion (10 U/ml) at 50° C. for 60 minutes, and then denatured at 95° C. for 30 minutes. The primer-probe set used should be specific to a non-native portion of the rAAV vector genome, for example, the poly(A) sequence of the protein of interest. The PCR product can be amplified using any appropriate set of cycling parameters, based on the length and composition of the primers, probe, and amplified sequence. Alternative protocols are disclosed in, for example, Lock et al., Human Gene Therapy Methods 25(2): 115-125 (2014).

Throughout the description, where apparatus, devices, and systems are described as having, including, or comprising specific components, or where processes and methods are described as having, including, or comprising specific steps, it is contemplated that, additionally, there are apparatus, devices, and systems of the present invention that consist essentially of, or consist of, the recited components, and that there are processes and methods according to the present invention that consist essentially of, or consist of, the recited processing steps.

Practice of the invention will be more fully understood from the foregoing examples, which are presented herein for illustrative purposes only, and should not be construed as limiting the invention in any way.

EXAMPLES

Example 1

Figure 2:
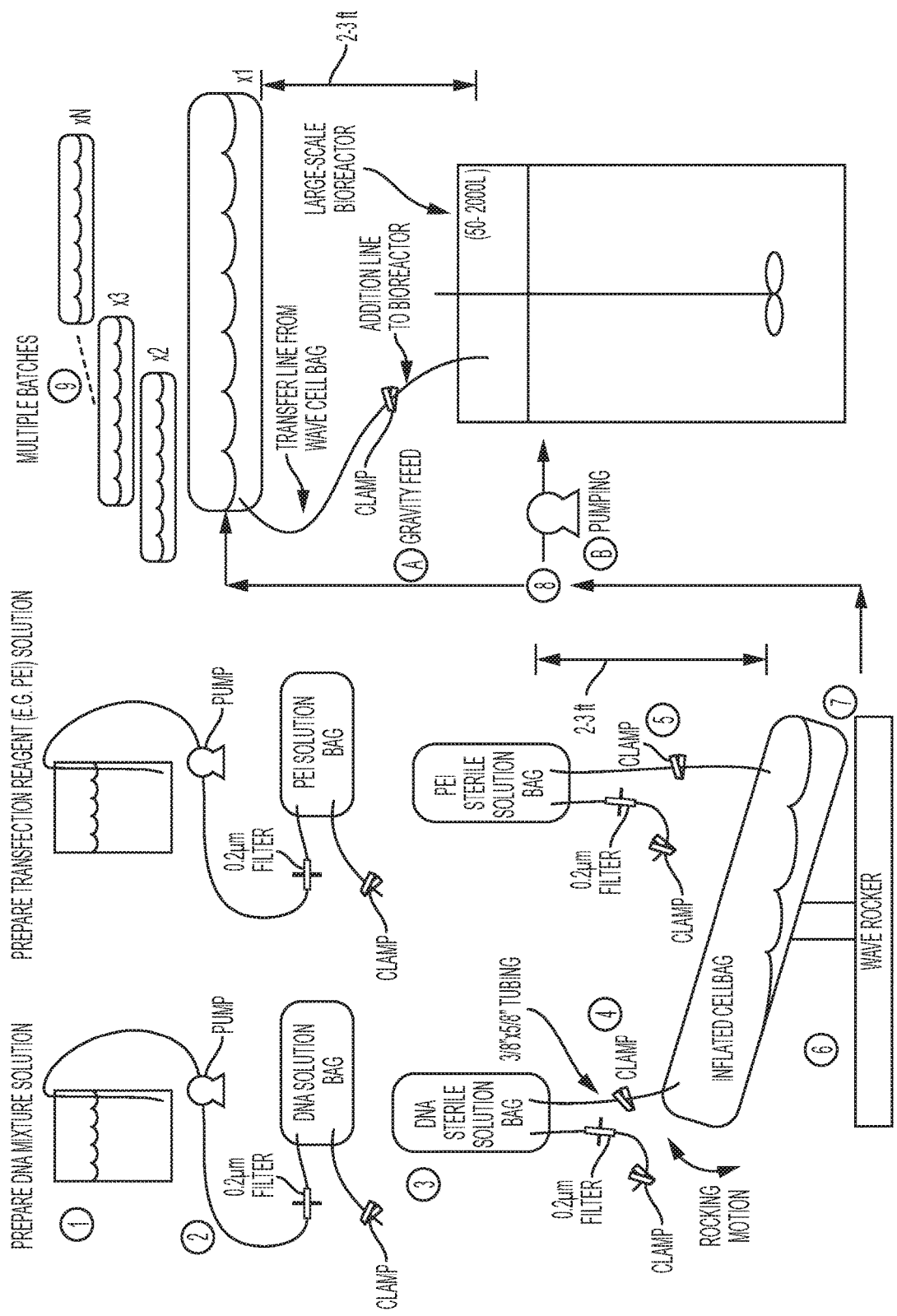
FIG. 2 is a schematic of the procedure for preparing a transfection master mix at a large scale using a ReadyTo-Process WAVE™ 25 Bioreactor. The transfection mix is introduced into a bioreactor containing cells by gravity feed (one batch or multiple batches) or pumping.

The method of the instant invention may be accomplished by the following exemplary embodiment, which is also depicted in FIG. 2:

1. DNA and transfection reagent solutions are prepared in transfection media or water in solution bottles or other appropriate containers.
2. Each solution is separately sterilized by pumping the solution from the preparation flask though ⅜" interior diameter (ID) tubing, through a 0.2 μm filter, and into a sterile bag.
3. The sterile bag containing the DNA solution and transfection reagent solution are each aseptically welded to the ⅜" ID tubing lines of a 20 L WAVE Cellbag™ bioreactor chamber ("cellbag"). The cellbag is placed on the rocking platform of a ReadyToProcess WAVE™ 25 Rocker ("WAVE rocker") and inflated, and each sterile bag containing the DNA and transfection reagent solutions is hung 2-3 feet above the rocker, with a clamp occluding the line connecting the sterile bag to the cellbag.
4. The clamp occluding the line connecting the sterile bag containing the DNA solution to the cellbag is opened, allowing the DNA solution to enter the cellbag via gravity feed or by pumping.
5. Following addition of the DNA solution to the cellbag, the clamp occluding the line connecting the sterile bag containing the transfection reagent solution to the cellbag is opened, allowing the transfection reagent solution to enter the cellbag via gravity feed or by pumping to form the transfection master mix.
6. Immediately following the addition of the transfection reagent solution to the cellbag, the mixing program is initiated. A 3 L transfection master mix can be mixed for 1 minute at 10 rpm with a 7° rocking angle, a 12 L transfection master mix can be mixed for 1 minute at 15 rpm with a 12° rocking angle.
7. Following completion of the mixing program, the WAVE rocker is stopped, and the master mix is allowed to rest for a 20 minutes incubation period at room temperature without moving cellbag or further agitation of the master mix.
8. Following completion of the incubation period, the cellbag containing the master mix is added to a bioreactor by gravity feed or by pumping. For gravity feed (A) the cellbag containing the master mix can be gently positioned 2-3 ft. above a bioreactor containing cells for transfection, and the transfer line from the cellbag is sterilely welded to the addition line of the bioreactor and unclamped, allowing the master mix to flow into the bioreactor by gravity feed. For pumping (B), the cellbag can be sterilely welded to the addition line of the bioreactor and pumped into the reactor at a sufficient rate to stay within the target incubation period window. This rate can depend on the volume of the transfection mix, the tubing size, pump type and size, and can be evaluated empirically to confirm the absence of any undesirable aggregate formation.
9. For large scale transfection of cells in a bioreactor, the preparation and the addition of master mix can be repeated to enable batch addition of several transfection mixtures in series or parallel to enable adequate transfection of larger volume bioreactors. It is envisioned that the current invention can enable preparation of transfection mixtures for bioreactors of 2000 L or greater scale.

Example 2

Methods for preparing transfection master mixes were compared. PEI solutions were made by dissolving PEI-MAX 40 kDa (PolySciences) in FreeStyle™ F17 Expression Media (ThermoFisher) at concentrations of 20, 40, and 80 μg/ml. DNA solutions were prepared by dissolving the cis rAAV plamids, trans-rep-cap plasmids, and helper plasmids in FreeStyle™ F17 Expression Media at concentrations of 10, 20, and 40 μg/ml as shown in FIG. 1. Master mix samples were prepared by pouring 50 ml of PEI solution into 50 ml of DNA solution according to Table 1 in either 100 ml bottles or 250 ml Erlenmeyer flasks.

TABLE 1

| Master Mix | PEI concentration | DNA concentration | Volume of addition to cells |
|---|---|---|---|
| 1 | 20 μg/ml | 10 μg/ml | 10 ml |
| 2 | 40 μg/ml | 20 μg/ml | 5.0 ml |
| 3 | 80 μg/ml | 40 μg/ml | 2.5 ml |

Following addition of the PEI solution into DNA solution master mix samples were mixed by 10× inversion by hand followed by 20 minutes of room temperature incubation.

Following the incubation period, 10 ml, 5 ml, or 2.5 ml of each master mix respectively as shown in Table 1, was added to Erlenmeyer Shaker Flasks containing FreeStyle™ 293F cells (Thermo) at a uniform density in 100 ml of production media (FreeStyle™ F17 Expression Media supplemented with 8 mM L-glutamine and 0.5 g/L Pluronic). Cells were cultured for 5 days, after which time rAAV titer was measured using a DNAse resistant particle qPCR assay.

Figure 3A:
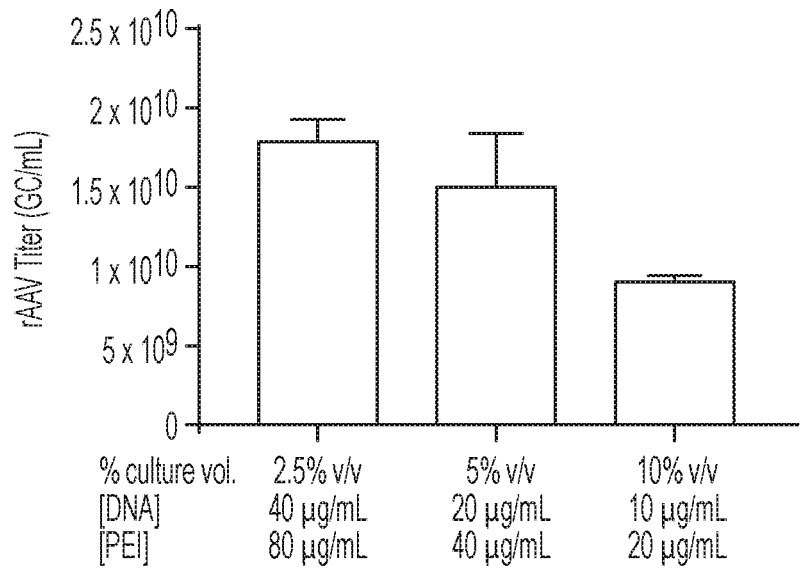
FIG. 3A, 3B and 3C are bar graphs depicting the rAAV titer (GC/ml) produced by cells transfected using PEI/DNA master mixes prepared by different methods.

Results of this experiment are depicted in FIG. 3A. Each transfection mix was added to the cell cultures at either 10% v/v, 5% v/v, or 2.5% v/v, respectively, to delivery equal total amounts of DNA and PEI to the cultures. The result of each condition is the average of two replicates, and each error bar represents a standard deviation. Transfection master mix prepared at a higher concentration of DNA (40 µg/ml) and PEI (80 µg/ml) produced significantly greater rAAV yields compared to lower concentrated mixtures (10 µg/ml DNA and 20 µg/ml PEI). However, it was observed that a visible precipitate formed more readily, specifically over shorter incubation times and more sensitivity to mixing conditions, in samples with higher concentration of DNA and PEI compared to more dilute transfection master mix.

Example 3

In order to investigate the impact of mixing rate on the transfection mixture and subsequent rAAV production, a transfection mixture of 40 µg/ml PEI and 20 µg/ml DNA was prepared by either 10× inversion by hand followed by 20 minutes of room temperature incubation, mild agitation on a shake platform at 100 rpm for 20 minutes, or high agitation on a shake platform at 150 rpm for 20 minutes. In each instance the shake platform had an orbital diameter of 19 mm.

Figure 3B:
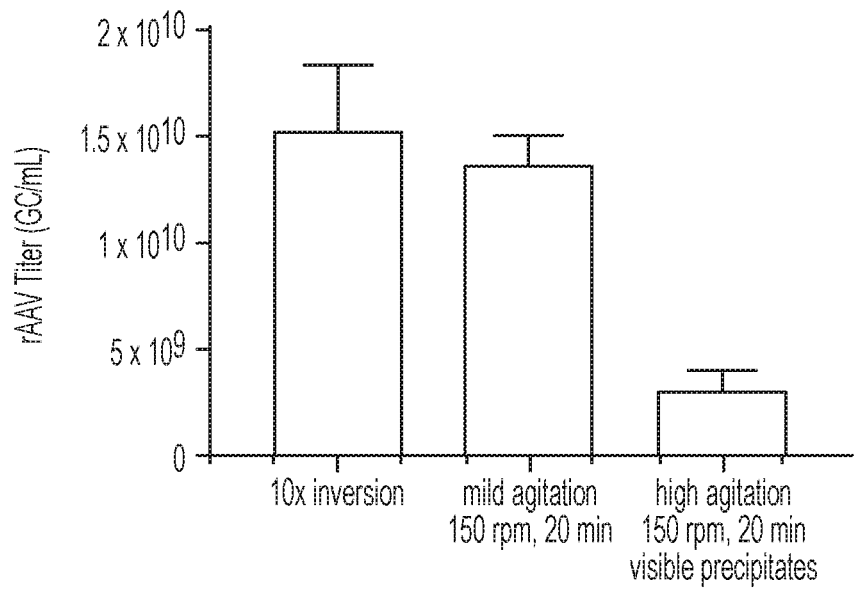

Results of this experiment are depicted in FIG. 3B. Master mix mixed by 10× inversion, or by mild agitation produced significantly higher rAAV yields compared to the high agitation treatment. It was observed that a visible precipitate formed in samples that underwent high agitation.

Example 4

In order to investigate the effect of incubation time on rAAV production, 100 ml master mixes were prepared as described in Example 3, with the exception that each was mixed by 10× inversion, and master mix samples were incubated for either 5 minutes, 20 minutes, 1 hour, or 3 hours before being used to transfect cells as described above.

Figure 3C:
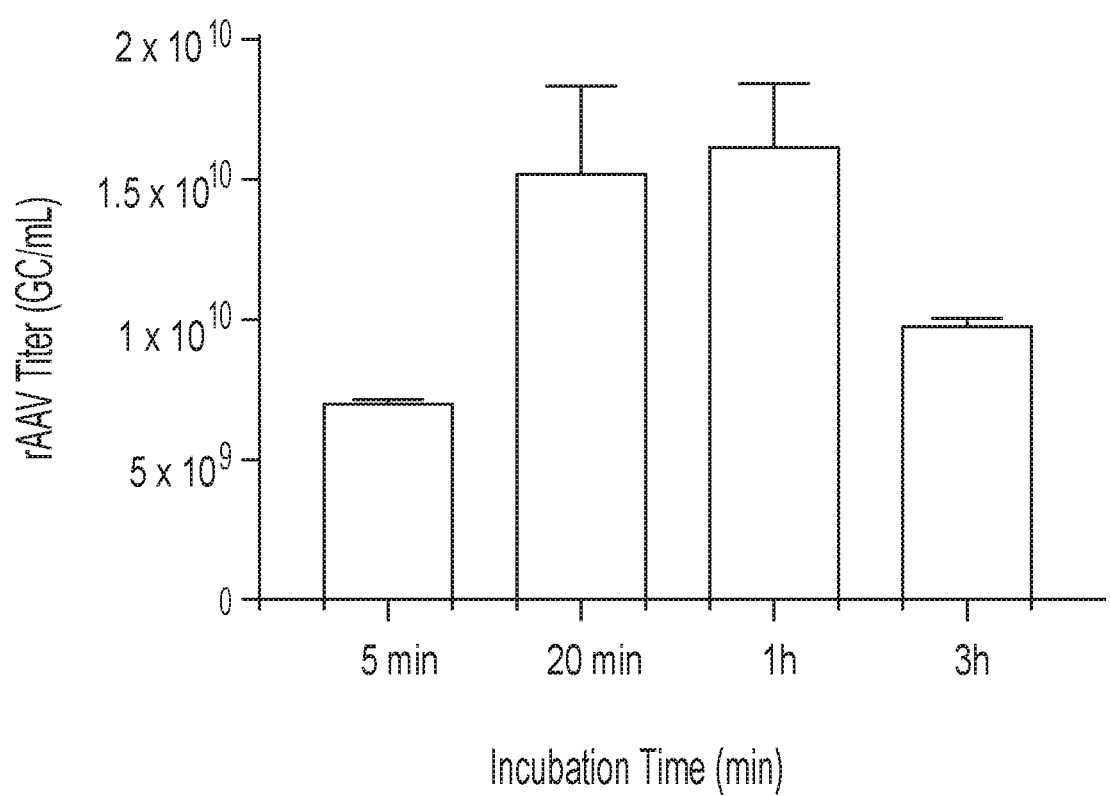

Results of this experiment are depicted in FIG. 3C. Master mix incubated after 10× inversion showed optimal incubation time for producing rAAV was between 20 minutes and 1 hour. Prior to this window (e.g., at 5 minutes. incubation) complexes were likely not fully formed, thus reducing transfection efficiency. After this window (e.g., at 3 hour incubation), visible precipitate had formed, indicating that complex-complex aggregation had begun, which also reduced transfection efficiency.

Example 5

Mixing conditions using the 20 L and 50 L WAVE Cellbag™ bioreactor chambers and ReadyToProcess WAVE™ 25 Rocker system were tested in order to find optimal conditions for making a master mix. 20 L and 50 L WAVE Cellbag™ bioreactor chambers ("cellbags") (GE) were placed on the rocking platform—ReadyToProcess WAVE™ 25 Rocker ("WAVE rocker") (GE), and filled with 4 L, 12 L, or 15 L (in 20 L cellbag), or 25 L, 26.5 L, or 29 L (in 50 L cellbag) volumes of water. For conditions that required inflated bags, air overlay was turned on via the HMI until the bag with fully inflated via the air inlet filter line.

At time 0, cellbags were spiked with either 400 g/L or 100 g/L glucose solution via the cellbag injection port at a volume necessary to result in a final bulk fluid concentration of 4 g/L glucose. A diagram of the cellbag is shown in FIG. 5 Immediately following glucose addition, a time 0 sample was taken from the syringe sampling port. Following the time 0 sample, rocking was initiated according to the pre-programmed mixing conditions listed in Tables 2 and 3 for a 20 L cell bag or a 50 L cellbag, respectively. Samples were taken at regular intervals from the sampling port, and glucose concentration was measured using the ABL90 Blood Gas Analyzer (Radiometer America) as shown in FIG. 4. Mixing and sampling was continued until the bulk fluid glucose concentration was stable at or near 4 g/L. Mixing time for each condition was determined by the amount of time it took to achieve consecutive stable measurements of the final sampled glucose concentration (approx. 4 g/L). Methods here can be applied to find optional mixing conditions for master mixes of larger volumes.

TABLE 2

Optimization of mixing conditions in 20L WAVE Cellbag ™ bioreactor chamber by spiking glucose in 4 L, 12 L, or 15 L water, respectively.

| Expt. # | Vol. | Agitation | Angle (°) | Inflation (Y/N) | Glucose spike conc. | Glucose spike vol. | Glucose final conc. | mixing time/notes |
|---|---|---|---|---|---|---|---|---|
| i | 4 L | 10 rpm | 7 | N | 400 g/L | 40 ml | 4 g/L | ~3 minutes |
| ii | 12 L | 10 rpm | 7 | N | 400 g/L | 120 ml | 4 g/L | Did not mix well in under 20 minutes |
| iii | 12 L | 12 rpm | 12 | N | 400 g/L | 120 ml | 4 g/L | ~10 minutes |
| iv | 12 L | 12 rpm | 12 | Y | 100 g/L | 500 ml | 4 g/L | ~8 minutes |
| v | 12 L | 15 rpm | 12 | Y | 100 g/L | 500 ml | 4 g/L | ~1 minutes |
| vi | 12 L | 15 rpm | 12 | Y | 100 g/L | 500 ml | 4 g/L | ~1 min, duplicated run of experiment v. |
| vii | 12 L | 15 rpm | 12 | N | 100 g/L | 500 ml | 4 g/L | ~4 minutes |
| viii | 12 L | 15 rpm | 12 | Y | 400 g/L | 120 ml | 4 g/L | ~1 minute |
| ix | 12 L | 15 rpm | 12 | N | 400 g/L | 120 ml | 4 g/L | ~3 minutes |
| x | 15 L | 15 rpm | 12 | Y | 400 g/L | 120 ml | 4 g/L | Did not reach steady-state |

TABLE 2-continued

Optimization of mixing conditions in 20L WAVE Cellbag™ bioreactor chamber by spiking glucose in 4 L, 12 L, or 15 L water, respectively.

| Expt. # | Vol. | Agitation | Angle (°) | Inflation (Y/N) | Glucose spike conc. | Glucose spike vol. | Glucose final conc. | mixing time/notes |
|---|---|---|---|---|---|---|---|---|
| | | | | | | | | concentration in under 5 minutes |
| xi | 15 L | 18 rpm | 12 | Y | 400 g/L | 120 ml | 4 g/L | ~1 minute |

TABLE 3

Optimization of mixing conditions in 50 L WAVE Cellbag™ bioreactor chamber by spiking glucose in 25 L, 26.5 L or 29 L water, respectively. 25 L-29 L of transfection master mix volumes is suitable, for example, for 500 L cell culture production media given a 5%-6.5% v/v master mix volume/cell culture media volume.

| Expt. # | Vol. | Agitation | Angle (°) | Inflation (Y/N) | Glucose spike conc. | Glucose spike vol. | Glucose final conc. | mixing time/notes |
|---|---|---|---|---|---|---|---|---|
| i | 25 L | 10 rpm | 12 | Y | 400 g/L | 250 ml | 4 g/L | Did not reach steady-state concentration in under 5 minutes |
| ii | 25 L | 15 rpm | 12 | Y | 400 g/L | 250 ml | 4 g/L | ~1 minute |
| iii | 25 L | 13 rpm | 12 | Y | 400 g/L | 250 ml | 4 g/L | ~1 minute |
| iv | 25 L | 15 rpm | 12 | Y | 400 g/L | 250 ml | 4 g/L | ~1 minute |
| v | 25 L | 13 rpm | 12 | Y | 400 g/L | 290 ml | 4 g/L | ~1 minute |
| vi | 29 L | 15 rpm | 12 | Y | 400 g/L | 290 ml | 4 g/L | ~2 minutes |
| vii | 26.5 L | 12 rpm | 12 | Y | 400 g/L | 290 ml | 4 g/L | ~6 minutes |
| viii | 29 L | 14 rpm | 12 | Y | 400 g/L | 290 ml | 4 g/L | ~4 minutes |

Figure 4A:
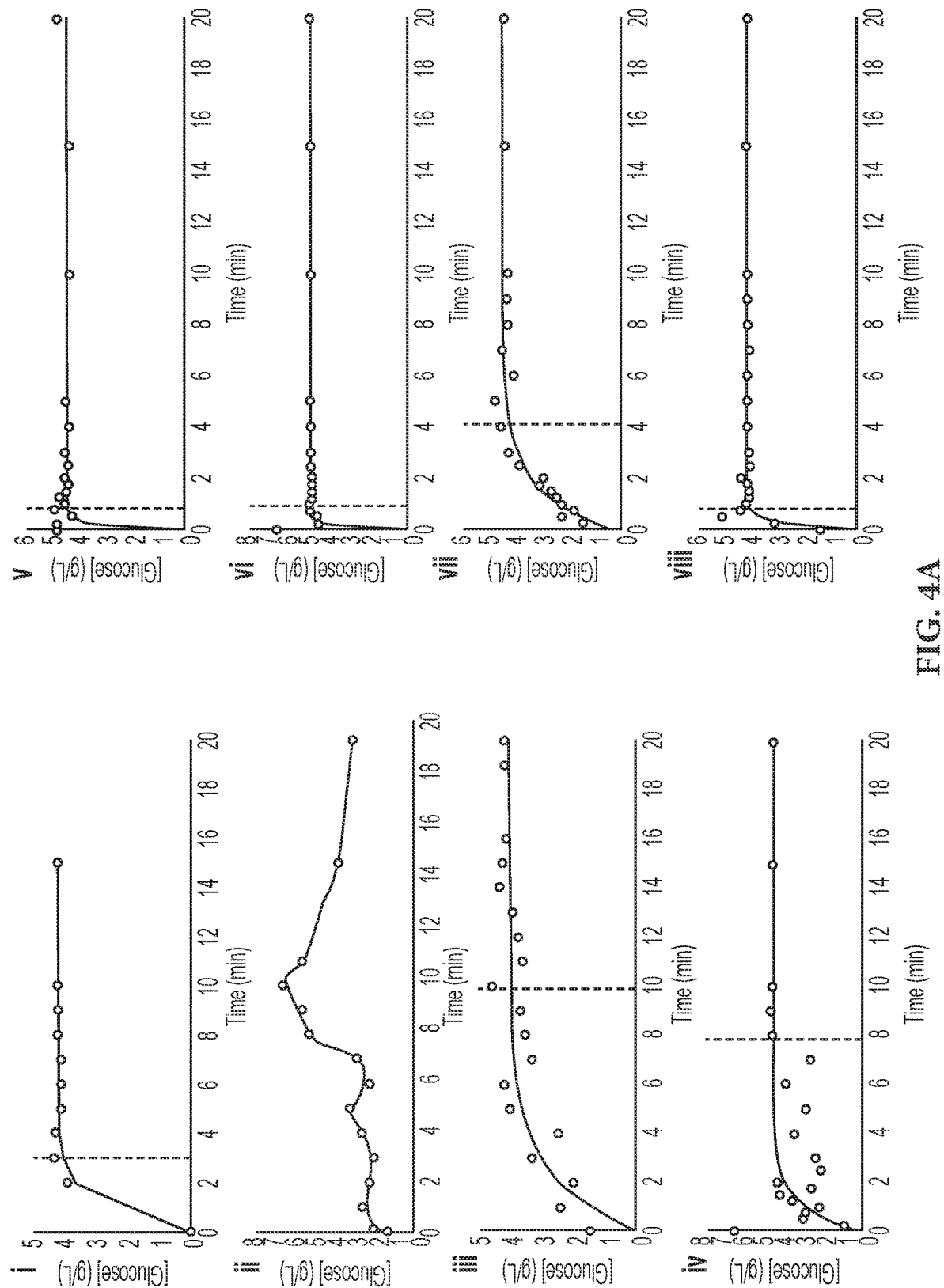
FIG. 4A shows graphs depicting the concentration of glucose over time collected at the sampling port (shown in FIG. 5) after spiking a concentrated glucose solution (100 g/L or 400 g/L) in water (4 L, 12 L, 15 L) in a 20 L Wave Cellbag™ and rocking at the predetermined rates and rocking angles shown in Table 1.
Figure 4B:
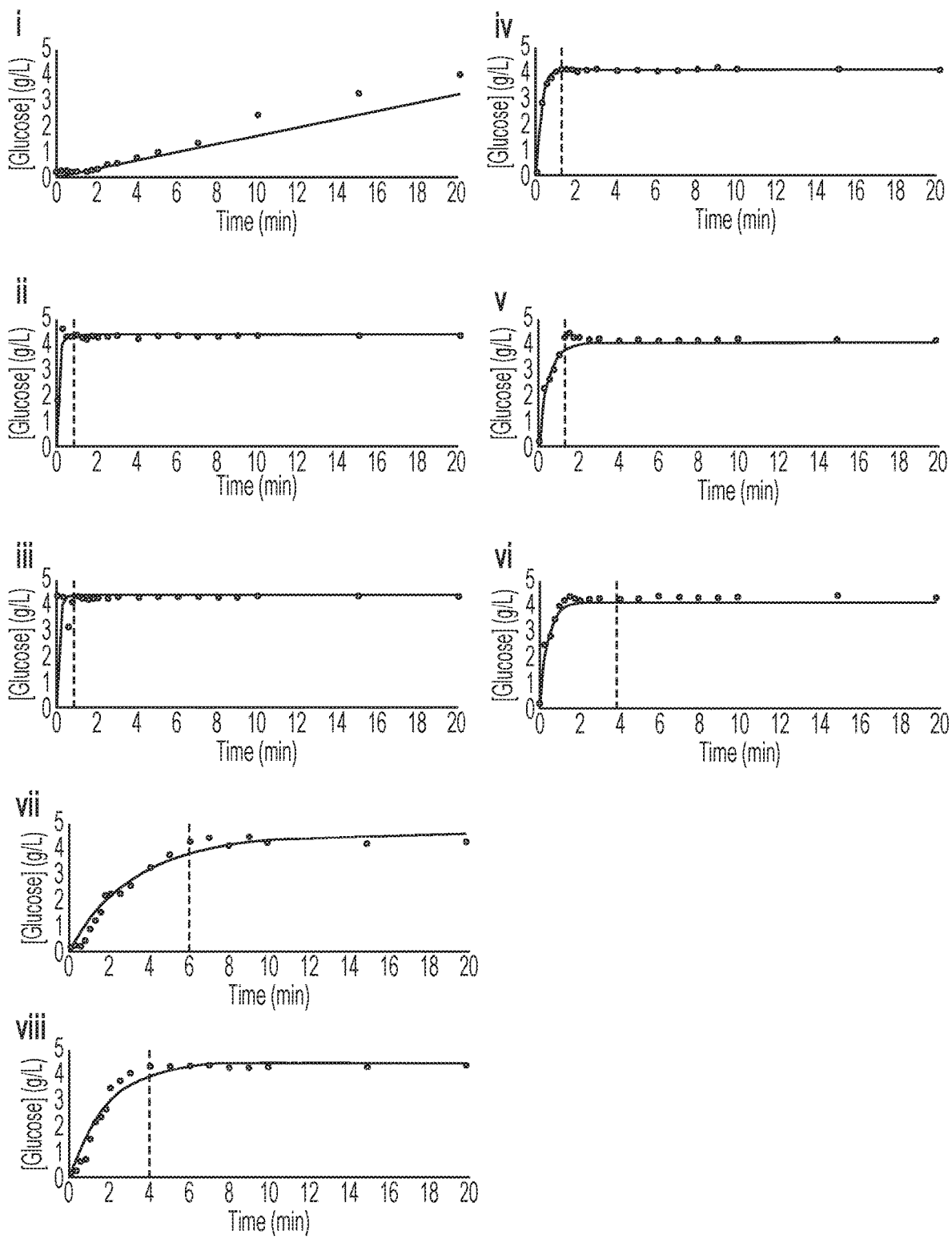
FIG. 4B. shows graphs depicting the concentration of glucose over time collected at the sampling port (shown in FIG. 5) after spiking a concentrated glucose solution (400 g/L) in water (25 L, 26.5 L or 29 L) in a 50 L Wave Cellbag™ and rocking at the predetermined rates and rocking angles shown in Table 2.
Figure 5:
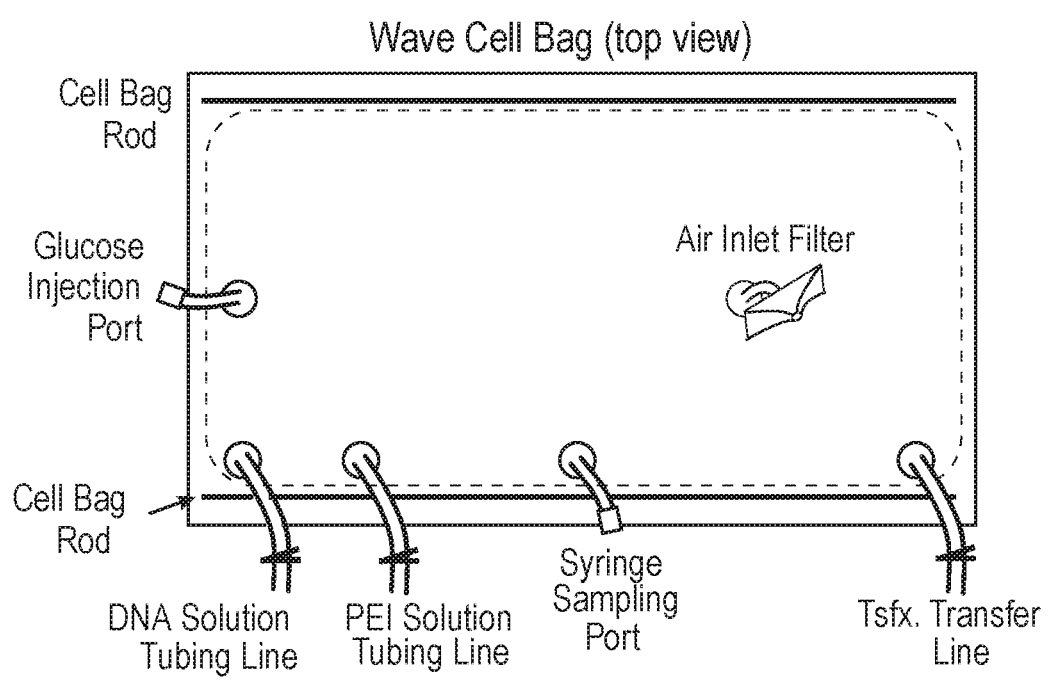
FIG. 5 is a schematic of the Wave Cellbag™.

Results of the various rocking parameters are presented in FIG. 4A, panels (i-xi) and FIG. 4B, panels (i-viii). FIG. 4A depicts conditions for the 20 L cellbag conditions evaluated. FIG. 4B depicts conditions for the 50 L cellbag conditions evaluated. For each sample volume, parameters were identified that reached a steady state (4 g/L glucose) at the shortest mixing time.

Example 6

Transfection efficiency was compared between master mix samples made by large- and small-scale mixing protocols. Large-scale (12 L) master mix production was accomplished as follows: 6 L of DNA solution (20 µg/ml plasmid DNA in FreeStyle™ F17 Expression Media) and 6 L PEI solution (40 µg/ml PEI in FreeStyle™ F17 Expression Media) were each prepared in a sterile solution container and pumped through a 0.2 µm filter into individual sterile bags. The PEI solution bag and DNA solution bag were then welded onto two separate ⅜"×⅝" in lines on the cellbag. The cellbag was placed on top of the rocking platform of a ReadyToProcess WAVE™ 25 Rocker, and the bags of DNA and PEI solution were suspended 2-3 ft. above the cellbag. The DNA solution was then added to the cellbag by gravity feed, followed by the PEI solution Immediately after addition of the PEI, rocking was initiated for 2 minutes at 15 rpm and a 12° rocking angle. Following mixing, the cellbag was kept on the still rocker at room temperature, and duplicate 5 ml aliquots were removed from the sampling port by syringe after the following incubation periods: 10 minutes, 20 minutes, 30 minutes, 45 minutes, 60 minutes, and 80 minutes.

Figure 6:
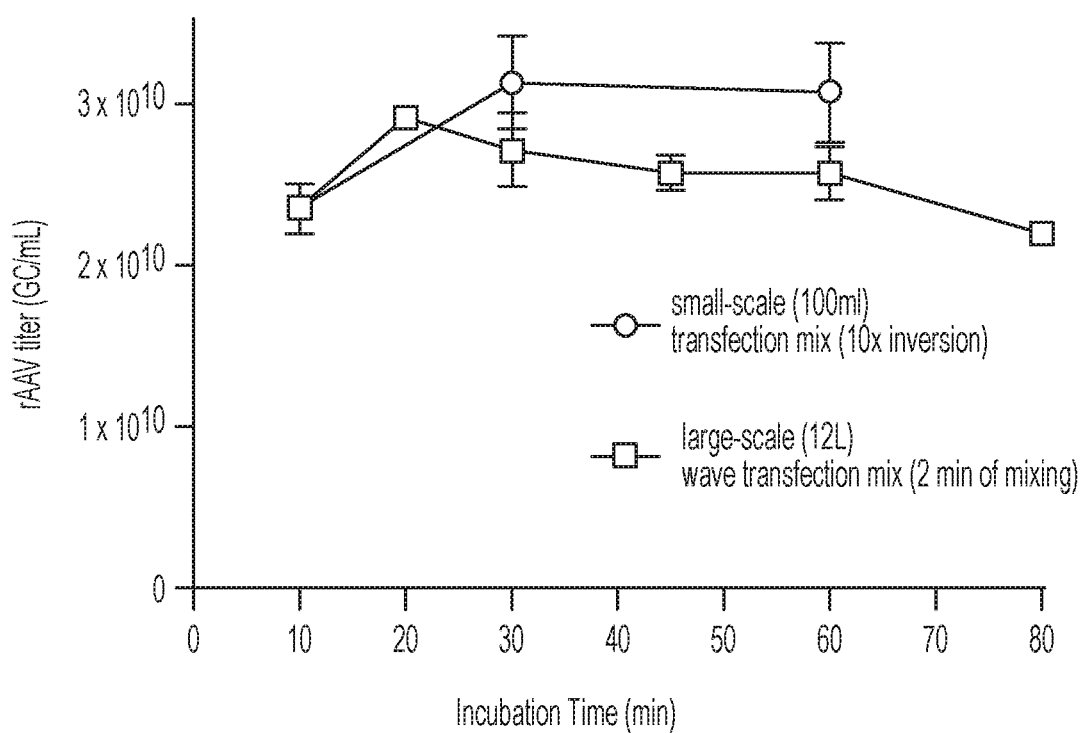
FIG. 6 is a graph depicting the effect of incubation time after mixing 20 µg/ml DNA and 40 µg/ml PEI on the rAAV titer (GC/ml) produced from cells transfected using the transfection master mix. Closed circles show rAAV titer produced using the transfection mix produced at a small scale by 10× inversion in 100 ml bottles, followed by 10, 30, or 60 minutes of incubation. Closed squares show rAAV titer produced using the transfection mix produced at large scale (12 L) by mechanical rocking for 2 minutes in a 20 L WAVE Cellbag™ bioreactor chamber, followed by 10, 20, 30, 45, 60, or 80 minutes of incubation. Results show the average of two replicates, with error bars representing standard deviations.

Small-scale master mix production was accomplished as follows: A 100 ml sample of master mix was prepared by combining 50 ml of 40 µg/ml DNA solution and 50 ml of 20 µg/ml PEI solution from the same DNA and PEI solution bags as were used to produce the 12 L master mix described above. The small-scale master mix was mixed by 10× inversion, and was incubated at room temperature over time. Two 5 ml aliquots were removed at 10 minutes, 30 minutes, and 60 minutes of the incubation period. Each 5 ml aliquot was added to a 100 ml shake-flask culture of packaging cells at 5% v/v addition (for a final concentration of 1 µg/ml DNA and 2 µg/ml PEI). Cells were cultured for 5 days, after which time rAAV titer was measured using a DNAse resistant particle qPCR assay. FIG. 6 depicts rAAV titer produced in cells as a function of incubation time of the transfection master mix, and shows that a transfection master mix made by large scale mixing methods followed by 20-30 minutes of incubation performed as well as the master mix made by small scale mixing methods.

Example 7

Figure 7:
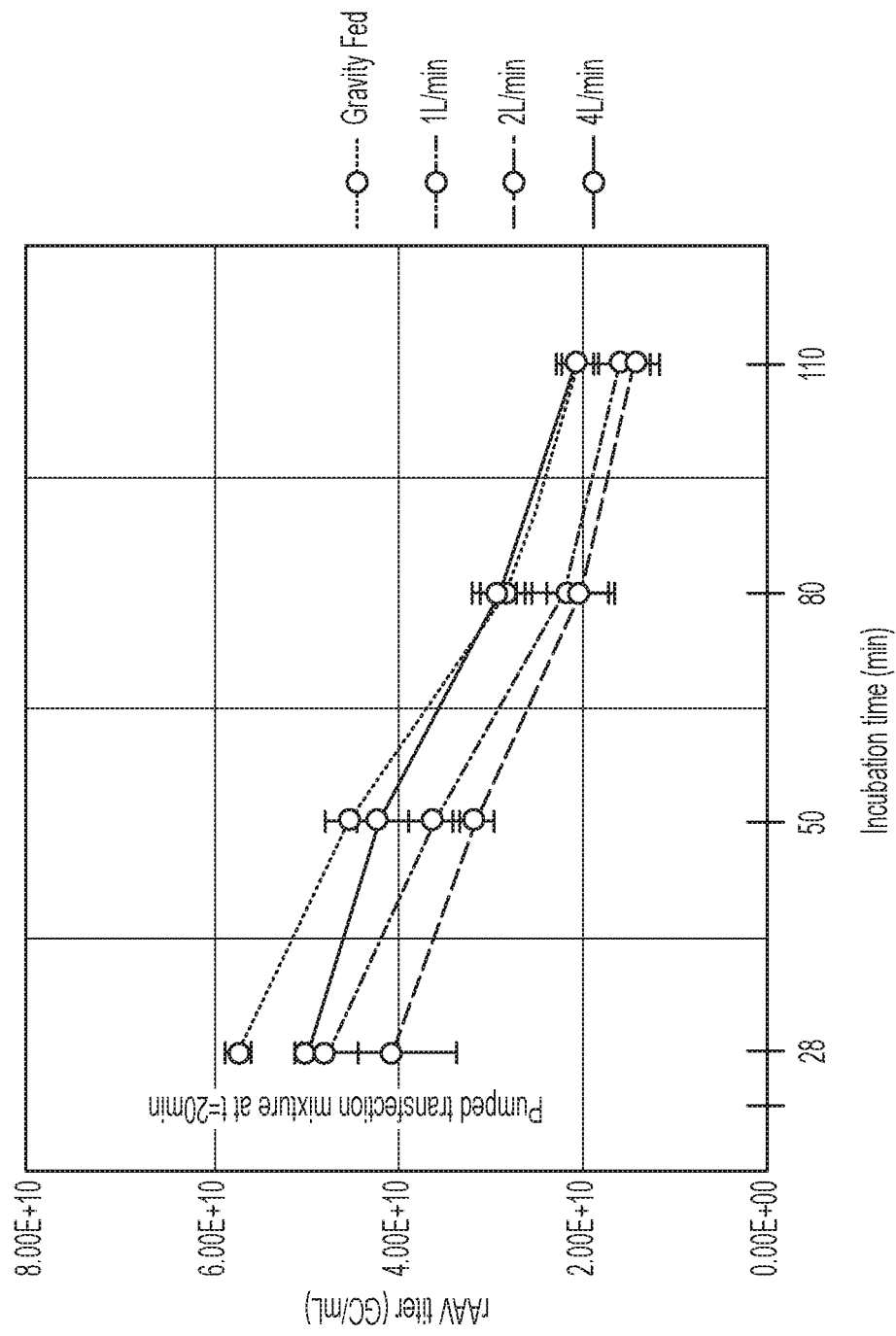
FIG. 7 is a graph showing the effect of pumping of the transfection master mix on resulting rAAV titer. Wave-optimized transfection mix was pumped into a bioreactor containing packaging cells for producing rAAV. The rAAV titer was measured under each condition, and the results show the average of two replicates, with error bars representing standard deviations.

To test the delivery of transfection mix by pumping, a 4 L transfection mixture was prepared by adding a 2 L DNA solution to a 20 L cellbag by gravity feed, followed by 2 L of PEI solution Immediately after addition of the PEI, rocking was initiated for 1 minute at 10 rpm and a 7° rocking angle. Following wave-optimized mixing, the cellbag was kept on the still rocker at room temperature for 20 minutes. After the incubation period, 1 L aliquots of the 4 L transfection mixture were either removed by gravity feed or pumped via a peristaltic pump at 1 L/min, 2 L/min, or 4 L/min through ⅜"×⅝" tubing into 1 L sample containers. Two 4.6 ml aliquots were removed at 28 minutes, 50 minutes, 80 minutes, and 110 minutes afterwards from each of the 1 L sample containers (gravity fed, 1 L/min, 2 L/min, or 4 L/min). Each aliquot was added to a 30 ml shake-flask culture of packaging cells at a uniform density. Cells were cultured for 5 days, after which time rAAV titer was measured using a DNAse resistant particle qPCR assay. FIG. 7 depicts rAAV titer as a function of incubation time post gravity feed or pumping, and shows that delivery by gravity feed or by pumping at 1 L/min, 2 L/min or 4 L/min makes little difference in the resulting rAAV titer. As observed previously, the timing of transfection master mix addition to cell culture is important, with earlier time (28-minute incubation) leading to greater rAAV titers than later times.

Example 8

Figure 8:
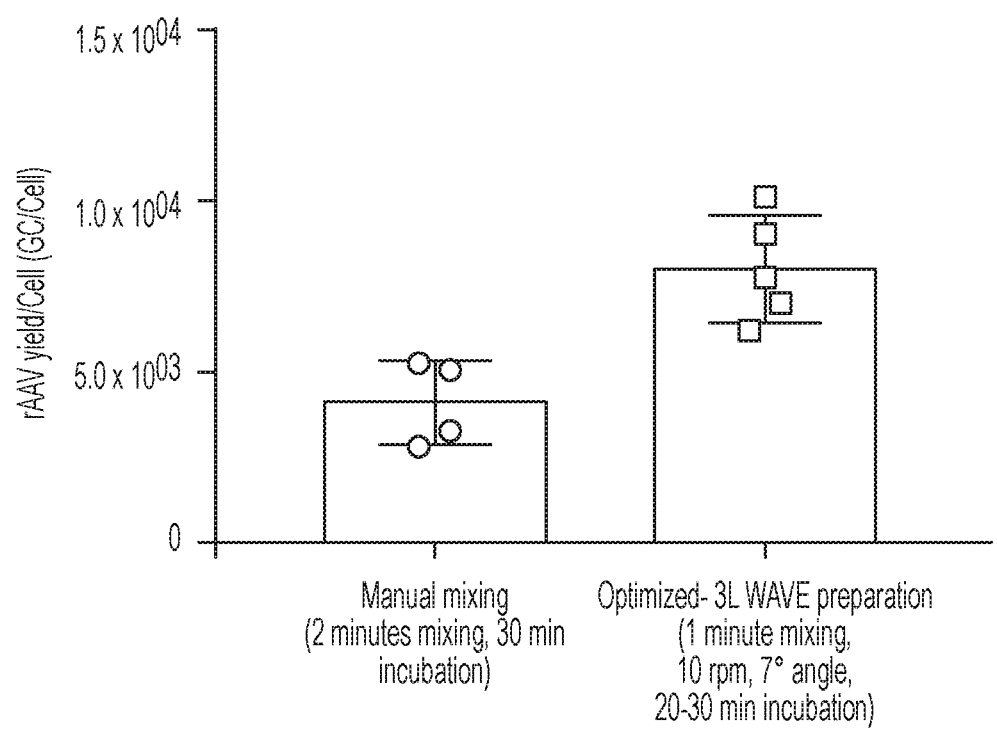
FIG. 8 is a graph comparing the rAAV yield/cell (GC/cell) of the manual-mixing and the wave-mixing methods used for producing the respective transfection master mixes. Results represent averages and standard deviations derived from multiple runs for the two master mixes, as noted.

Transfection efficiency was compared between large scale master mix prepared by hand and large scale master mix prepared using the Wave Rocker. PEI and DNA solutions were prepared as described above. Manual preparation was accomplished as follows: 2 L of DNA solution was pumped into a 5 L Biotainer bag (ThermoFisher), followed by 2 L of PEI solution. The solution was then mixed for 2 minutes by alternately raising and lowering each end of the bag by hand. Wave optimized mixing was accomplished by gravity feeding PEI and DNA solutions into cellbags to a final volume of 3 L or 12 L, and mixing for 2 minutes at either 10 rpm and 7° rocking angle (for 3 L) or 15 rpm and 12° rocking angle (for 12 L). After mixing, the transfection mix samples were then incubated at room temperature for 20-30 minutes, and used to transfect 50 L cultures of packaging cells by 6.5% v/v addition. rAAV titer was subsequently measured by DNAse-resistant particle qPCR assay. rAAV titer (GC/ml) was normalized by the viable cell density at the time of transfection (viable cells/ml) to allow comparison across different culture volumes. FIG. 8 depicts that transfection master mix produced by mechanical rocking resulted in significantly higher rAAV titer relative to manually mixing.

Example 9

Figure 9:
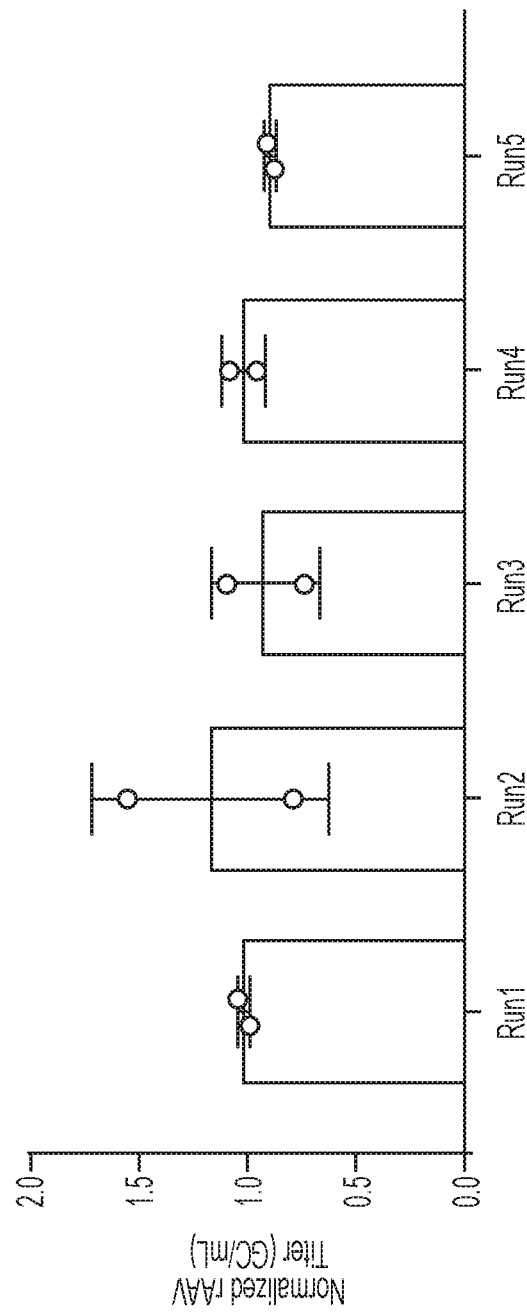
FIG. 9 is a graph demonstrating the reproducibility of the 12 L wave-based transfection master mix preparation method. Each 12 L transfection master mix was used to transfect a 200 L culture of packaging cells, and the rAAV titer produced was quantified by qPCR. A total of five runs were performed, and results from run 2 to run 5 were normalized to the average value of run 1. Each run is the average of biological duplicates.

In order to test the reproducibility of the method of producing transfection mix by mechanical rocking, a 12 L transfection master mix was produced by mixing 6 L of PEI and 6 L DNA solution using the gravity-fed wave methods described above for this transfection mixture volume. The mix was then incubated for 20 minutes at room temperature before being added to a 200 L culture of packaging cells. rAAV titer was subsequently measured by DNase resistant particle qPCR assay. Each run contains two replicates (the average and the standard deviation was shown), and the same experiment was run four more times. FIG. 9 shows rAAV titers from 5 runs, with run 2 to run 5 normalized to the average titer produced from Run 1.

INCORPORATION BY REFERENCE

The entire disclosure of each of the patent and scientific documents referred to herein is incorporated by reference for all purposes.

Equivalents

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes that come within the meaning and range of equivalency of the claims are intended to be embraced therein.

What is claimed is:

1. A method of preparing a transfection master mix comprising the steps of:
   (1) introducing a DNA solution and a transfection reagent solution into a mixing container to create a transfection master mix, wherein the volume of the transfection master mix is 1 L or greater;
   (2) rocking the mixing container with a mechanical rocking device for a period of about 1 minute to about 10 minutes at 10 rpm to 15 rpm and about 7 degrees to about 12 degrees rocking angle to reach a steady state concentration of DNA within the transfection master mix; and
   (3) incubating the transfection master mix for an incubation period of about 20 minutes to about 30 minutes, wherein the transfection master mix is substantially still during the incubation period;
   wherein the transfection master mix consists essentially of the DNA solution and the transfection reagent solution;
   wherein the DNA solution comprises plasmids selected from the group consisting of recombinant adeno-associated virus (rAAV) cis plasmids, rAAV trans-rep-cap plasmids, and helper plasmids; and
   wherein the transfection master mix is for co-transfection of rAAV packaging cells for rAAV production.

2. The method of claim 1, wherein the mixing container is (a) a single-use disposable container; (b) a pre-sterilized container; (c) a plastic bag; or (d) a single-use cell culture bag.

3. The method of claim 2, wherein the mixing container is a plastic bag or a single-use cell culture bag, which bag is fully or partially inflated.

4. The method of claim 1, wherein the transfection reagent solution comprises a chemical transfection reagent selected from the group consisting of: a cationic polymer, calcium phosphate, DEAE-dextran, an activated dendrimer, and a cationic lipid.

5. The method of claim 4, wherein the cationic polymer is polyethylenimine.

6. The method of claim 1, wherein the DNA solution and/or the transfection reagent solution is sterile.

7. The method of claim 1 further comprising the step of (a) sterilizing the DNA solution prior to introducing the DNA solution into the mixing container;
   and/or (b) sterilizing the transfection reagent solution prior to introducing the transfection reagent solution into the mixing container.

8. The method of claim 1, wherein the mechanical rocking device comprises a rocking platform.

9. The method of claim 1, wherein the volume of the transfection master mix is 3 L or greater, 12 L or greater, 15 L or greater, 25 L or greater, 50 L or greater, or 100 L or greater.

10. The method of claim 1, wherein the volume of the transfection master mix is between 1 L and 100 L.

11. The method of claim 10, wherein the volume of the transfection master mix is 1 L, 3 L, 12 L, 15 L, 25 L, or 29 L.

12. The method of claim 1, wherein (a) the volume of the transfection master mix is 4 L, and the rocking the mixing container is at an angle of 7 degrees, at 10 rpm, and for about 1 minute to about 2 minutes; or (b) the volume of the transfection master mix is 12 L, and the rocking the mixing container is at an angle of 12 degrees, at 15 rpm, and for about 1 minute to about 2 minutes.

13. The method of claim 1, wherein the step of introducing the DNA solution and the transfection reagent solution into the mixing container is accomplished sterilely.

\* \* \* \* \*